June 13, 1933.     E. C. LEWIS     1,914,268
PISTON
Filed Nov. 21, 1932
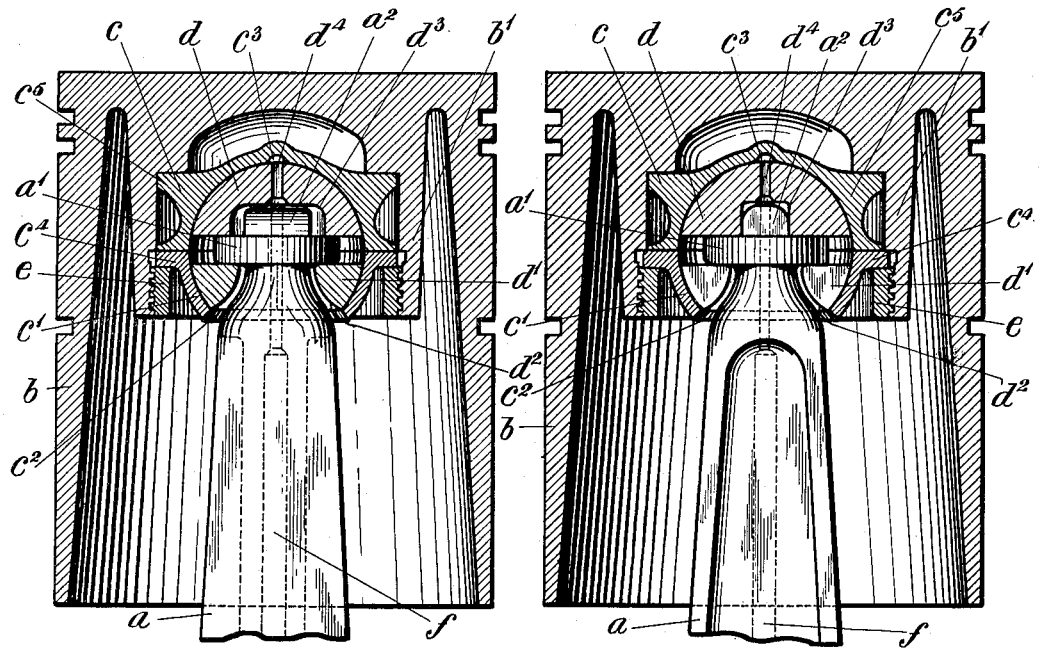
Fig:1.     Fig:2.
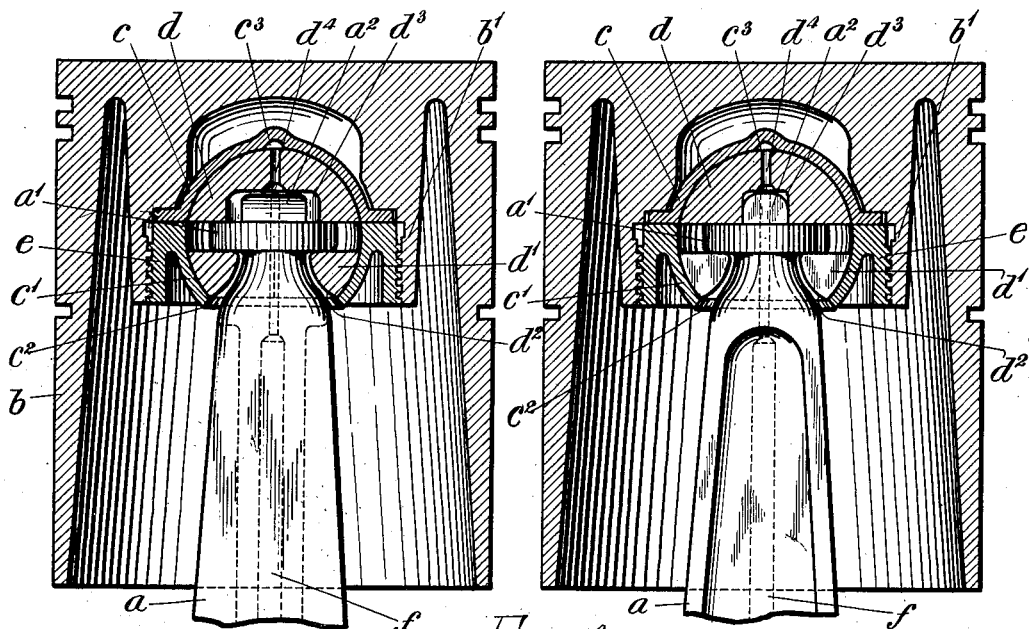
Fig:3.     Fig:4.
INVENTOR
Eric C. Lewis
by Richard E. Babcock
Attorney Patented June 13, 1933

1,914,268

UNITED STATES PATENT OFFICE

ERIC CRISP LEWIS, OF STOKE, COVENTRY, ENGLAND

PISTON

Application filed November 21, 1932. Serial No. 643,713.

This invention relates to pistons of the kind in which the joint between the piston and the connecting rod is of the ball and socket type. The object of the invention is to improve the construction of the joint so as to enable the piston to accommodate itself to the cylinder bore in a lateral direction relatively to the connecting rod without affecting the free working of the joint.

The invention is particularly applicable to internal combustion engines where, in consequence of expansion of the cylinder block in a direction parallel with the crankshaft, there is a tendency for the cylinders to become slightly deformed.

According to this invention the pivotal centre of the joint is fixed in relation to the piston, provision being made for a limited degree of relative movement between the connecting rod and the said joint in a direction parallel with the axis of the crank shaft.

Provision is also made for enabling the joint to withstand the severe stresses imposed upon it in service and to ensure an adequate supply of lubricant reaching the working faces of the joint.

In the accompanying drawing,

Figures 1 and 2 are sectional views of the improved joint taken in planes at right angles to each other.

Figures 3 and 4 are similar views illustrating a slight modification.

Referring to the drawing, $a$ represents the connecting rod and $b$ the piston which can be die cast or forged in any suitable alloy with an internal central pillar or tube $b^1$ cast with or attached to the crown or skirt for the purpose of providing a means of attachment for the socket $c$ of the ball and socket joint. The end of the connecting rod is made with a head $a^1$ which is flat in a plane at right angles to the longitudinal axis of the rod. The ball $d$ is divided into two sections in the same plane and, in order to enable the ball sections to be assembled, the lower part $d^1$ of the ball is sub-divided diametrically and formed with a central flared opening $d^2$ to receive, with a limited amount of clearance, the neck of the connecting rod below the head $a^1$.

The contacting faces of the upper part of the ball and the flat head of the connecting rod have a tongue and groove engagement $a^2$ $d^3$ along a diameter parallel with the axis of the crank shaft so that a limited amount of relative movement between the ball $d$ and rod $a$ is possible in this direction only. The ball sections may be made of any suitable metal or material that will withstand the stresses and wear to which they are subject in use. The said sections may, for example, be made of a composition of graphite and a non-ferrous metal, such as copper, the two ingredients being mixed together in granular form and subjected to high pressure in dies of the shape of the required sections. This material combines the advantages of a hard wear resisting property with a porosity such as will allow lubricating oil to percolate through it.

The socket $c$ is made in upper and lower sections $c$, $c^1$ of which the former takes a seating in the pillar or tube $b^1$ aforesaid whilst the lower section $c^1$, which has a central hole $c^2$ of a diameter sufficient to clear the head $a^1$ of the connecting rod, is secured in position by means of a sleeve or collar $e$ screwing into the end of the said pillar or tube and abutting against a lip $c^4$ around the lower section $c^1$ of the socket. This collar may either constitute a separate part, as shown in Figures 1 and 2, or may be formed as an integral part of the socket section $c^1$ as represented in Figures 3 and 4.

Where the piston and collar are made of metals having different coefficients of expansion, the co-acting screw threads are, as shown, of preferably square section so that, when relative movement takes place between them due to expansion there is less tendency for the collar to work loose, a portion, at least, of the flanks of the square threads on one part being always in contact with the flanks of the threads on the other part.

In order to enable the upper part of the socket $c$ to withstand the severe tensional stresses to which it is subjected when the engine is running, it will be observed that in Figures 1 and 2 this part of the socket is strongly reinforced by means of an external flange $c^5$ the thickness of which exceeds that of the wall of the socket $c$. This flange can be recessed around its external circumference, as shown, to reduce unnecessary weight. Alternatively, as shown in Figures 3 and 4 the plane of division between the upper and lower sections $c$, $c^1$ of the socket instead of passing through the centre of the joint is off-set therefrom towards the crown of the piston thereby reducing the severity of the tensional stresses in the upper section of the socket.

Any suitable provision may be made for supplying the joint with lubricant, for example, the upper part of the ball $d$ can be bored through with an oil duct $d^4$ one end of which registers with an oil conduit $f$ opening to the head of the connecting rod whilst the other end opens to a small cavity $c^3$ in the socket. In this connection it will be observed that the groove $d^3$, which receives the rib or tongue $a^2$ on the flat end of the connecting rod and is formed in the upper section of the ball $d$, does not extend completely across the ball section but is closed at each end sufficient clearance between it and the tongue being left for relative movement to take place between the joint and the connecting rod in a direction parallel with the axis of the crank-shaft. The reason for forming the groove with closed ends is to make the joint oil-tight and prevent the lubricating oil from escaping between the parts of the ball instead of passing to the cavity $c^3$ to feed the working surfaces of the ball and socket.

By means of this invention it will be seen that the piston is free to accommodate itself, not only to the obliquity of the connecting rod, but to the cylinder also in so far as axial alignment of the latter with the crank may be adversely affected by longitudinal expansion of the cylinder block. Moreover, the piston being free to turn about the end of the connecting rod, the surface of the piston acting as a thrust face at any one cycle need not necessarily act as a thrust face on the next or any other cycle. The adoption of the present invention also enables the piston wall to be made of a uniform and thinner section thereby avoiding any risk of distortion, and reducing weight. Incidentally, it is computed that the improved piston will be less expensive to manufacture than the orthodox type fitted with gudgeon pins.

I claim:—

1. A universal coupling comprising a female member and a male member, in combination with a ball member comprising a plano-spherical element disposed in the socket of said female member and a head element rigidly connected to said male member and having a plane face engaging said plane face of said plano-spherical element, one of said elements being formed with an elongated groove extending through its plane face in a diametric direction with relation thereto and the other of said elements being formed with a centrally disposed rib fitting into said groove whereby relative rotary movement between said elements will be prevented, said rib being of such width and height as to make a snug fit in said groove and being of less length than said groove, whereby said female member together with said plano-spherical element may move bodily out of alignment with said male member.

2. A universal coupling comprising a female member and a male member, in combination with a plano-spherical block disposed in the socket of said female member and formed with an elongated groove extending through its plane face in a diametric direction with relation thereto, a plate rigidly connected to said male member and having a plane face engaging said plane face of said block, and a rib constituting the extreme end portion of said male member and extending into the groove in said block whereby relative rotary movement between said members will be prevented, said rib being of such width and height as to make a snug fit in said groove and being of less length than said groove whereby said female member together with said block may move bodily out of alignment with said male member.

3. A universal coupling comprising a female member and a male member, in combination with a plano-spherical block disposed in the socket of said female member and formed with an elongated groove extending through its plane face in a diametric direction with relation thereto, said block being formed with a central lubricating bore extending from its outer face into the adjacent portion of said slot, a head rigidly connected to said male member and having a plane face engaging said plane face of said block and a rib constituting the extreme end portion of said male member and extending into the groove in said block, whereby relative rotary movement between said members will be prevented, said rib being of such width and height as to make a snug fit in said groove and being of less length than said groove whereby said female member together with said block may move bodily out of alignment with said male member, said male member being formed with a lubricating bore communicating with said slot and said plane face of said head being in all directions in said plane of greater length in diameter than the length of said slot, whereby the contact of said plane faces will at all time seal the lubricant in said slot against escape between said plane faces.

In testimony whereof, I have signed my name to this specification at Coventry, England, this 7th day of November, 1932.

ERIC CRISP LEWIS.